(12) United States Patent
Nishida et al.

(10) Patent No.: US 8,482,396 B2
(45) Date of Patent: Jul. 9, 2013

(54) IMAGE INFORMATION GENERATION DEVICE

(75) Inventors: Osamu Nishida, Osaka (JP); Teruhisa Masui, Osaka (JP); Fumiaki Fujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 423 days.

(21) Appl. No.: 12/936,557

(22) PCT Filed: Mar. 18, 2009

(86) PCT No.: PCT/JP2009/055302
§ 371 (c)(1),
(2), (4) Date: Oct. 6, 2010

(87) PCT Pub. No.: WO2009/142056
PCT Pub. Date: Nov. 26, 2009

(65) Prior Publication Data
US 2011/0032094 A1 Feb. 10, 2011

(30) Foreign Application Priority Data
May 23, 2008 (JP) .................. 2008-135612

(51) Int. Cl.
*G09F 9/00* (2006.01)
(52) U.S. Cl.
USPC .......................... 340/461; 715/764

(58) Field of Classification Search
USPC .. 340/459, 461, 462, 815.4, 995.1; 345/7–10, 345/30; 715/700, 764
See application file for complete search history.

(56) References Cited

U.S. PATENT DOCUMENTS

| 4,589,081 A * | 5/1986 | Massa et al. .................. 702/185 |
| 5,764,139 A | 6/1998 | Nojima et al. |
| 6,510,386 B2 * | 1/2003 | Sakashita ....................... 701/428 |
| 2010/0169821 A1 | 7/2010 | Masui et al. |

FOREIGN PATENT DOCUMENTS

| JP | 07-057105 A | 3/1995 |
| JP | 11-311545 A | 11/1999 |
| WO | 2007/114166 A1 | 10/2007 |
| WO | 2008/146501 A1 | 12/2008 |

OTHER PUBLICATIONS

Official Communication issued in International Patent Application No. PCT/JP2009/055302, mailed on May 12, 2009.

\* cited by examiner

*Primary Examiner* — Thomas Mullen
(74) *Attorney, Agent, or Firm* — Keating & Bennett, LLP (57) ABSTRACT

A DPF controller (21) generates, as image information, a layout identifier (MEN) that specifies the layout of an image to be displayed on a liquid crystal display device (11), and an element image identifier (SEN) that specifies the display mode of element images that are being subjected to layout. When an SEN is newly determined and the newly determined SEN is equal to a previously determined SEN, the newly determined SEN is not output to a drawing controller (22).

9 Claims, 10 Drawing Sheets

| MEN : Name of layout | Transition destination MEN | Transition condition | | | |
|---|---|---|---|---|---|
| | | Logical expression | Comparison expression | Variable | Value |
| 0: Transition start | 1 | | EQ | Ignition | "OFF" |
| | 2 | | EQ | Ignition | "ACC" |
| | 3 | AND | EQ | Corner sensor (ALL) | "ON" |
| | | | NE | Select position | "P" |
| | 4 | | EQ | Shift position | "R" |
| | 11 | | EQ | Left winker | "ON" |
| | 12 | | EQ | Right winker | "ON" |
| 1: OFF screen | 2 | | NE | Ignition | "OFF" |
| 2: Accessory | 5 | | NE | Ignition | "ACC" |
| 3: Corner sensor | 6 | OR | EQ | Corner sensor (ALL) | "OFF" |
| | | | EQ | Select position | "P" |
| 4: Back traveling | 6 | | NE | Shift position | "R" |
| 5: Warning screen | 6 | | NE | Shift position | "N" |
| 6: Low-speed traveling | 7 | | GE | Speed | 30 |
| 7: Ordinary traveling | 6 | | LE | Speed | 25 |
| | 8 | | GE | Speed | 100 |
| 8: High-speed traveling | 7 | | LE | Speed | 95 |
| 9: Low-speed left-turn traveling | 6 | | EQ | Left winker | "OFF" |
| | 11 | | GE | Speed | 30 |
| 10: Low-speed right-turn traveling | 7 | | EQ | Right winker | "OFF" |
| | 12 | | GE | Speed | 30 |
| 11: Left-turn traveling | 7 | | EQ | Left winker | "OFF" |
| | 9 | | LE | Speed | 25 |
| 12: Right-turn traveling | 7 | | EQ | Right winker | "OFF" |
| | 10 | | LE | Speed | 25 |

| Screen | | Component | | |
|---|---|---|---|---|
| Name | MEN | Name | SEN | SDN |
| Ordinary traveling | 7 | Left winker [ON] | 1 | 100 |
| | | Left winker [OFF] | 2 | 101 |
| | | Right winker [ON] | 3 | 102 |
| | | Right winker [OFF] | 4 | 103 |
| | | Speed meter background 1 | 5 | 104 |
| | | Speed meter background 2 | 6 | 105 |
| | | Speed meter background 3 | 7 | 106 |
| | | Navigation [small] | 8 | 107 |
| | | Navigation [medium] | 9 | 108 |
| | | Navigation [large] | 10 | 109 |
| | | Navigation frame [ON] | 11 | 110 |
| | | Navigation frame [OFF] | 12 | 111 |
| Back traveling | 4 | Left winker [ON] | 1 | 112 |
| | | Left winker [OFF] | 2 | 113 |
| | | Right winker [ON] | 3 | 114 |
| | | Right winker [OFF] | 4 | 115 |

FIG. 6B

| Condition | Component | Number of rectangular partial area |
|---|---|---|
| LEFT_TURN = ON | Left winker [ON] | 1 |
| LEFT_TURN = OFF | Left winker [OFF] | 1 |
| RIGHT_TURN = ON | Right winker [ON] | 2 |
| RIGHT_TURN = OFF | Right winker [OFF] | 2 |

FIG. 6C

| Condition | Component | Number of rectangular partial area |
|---|---|---|
| 25 < SPEED < 80 | Speedometer background 1 | 3 |
| 80 ≦ SPEED < 100 | Speedometer background 2 | 3 |
| 100 ≦ SPEED | Speedometer background 3 | 3 |

FIG. 6D

| Condition | Component |
|---|---|
| 0 ≦ TIMER < 10 | Navigation [small] |
| 10 ≦ TIMER < 20 | Navigation [medium] |
| 20 ≦ TIMER < 30 | Navigation [large] |
| 30 ≦ TIMER | Navigation frame [ON] |

| Area identifier | Latest SDN | Display completion flag |
|---|---|---|
| 1 | 101 | ON |
| 2 | 103 | ON |
| 3 | 104 | ON |
| 4 | 109 | OFF |
| 5 | 110 | ON |

IMAGE INFORMATION GENERATION DEVICE

TECHNICAL FIELD

The present invention relates to a technique of presenting an image required for driving a mobile object such as an automobile to a driver, using a dot matrix display device, and in particular, to an image information generation device for generating image information for displaying the above-mentioned image to the display device, a display control device provided with the same, an information display system for a mobile object, a module for a driver seat, and a mobile object.

BACKGROUND ART

Conventionally, on a dashboard of an automobile or the like, analog-type or counter-type meters, and indicator lamps using, for example, electric bulbs, LEDs, etc. have been used mostly. Further, for digital display or indicator display of numbers, a segmented liquid crystal display unit also has been used generally.

However, recently, a dot matrix type image display device such as a liquid crystal panel display device also has come to be used on the dashboard of the automobile or the like. That is, at least a part of the dashboard is formed of a dot matrix type image display device capable of displaying an arbitrary pattern, and meters such as a speedometer, various indicators, and the like are displayed as images.

Thus, the use of the dot matrix type image display device for the dashboard of the automobile or the like allows the dashboard to have various display patterns. For example, the kinds of meters, indicators and the like to be displayed, and the arrangement or size thereof can be changed dynamically, if required. Further, for example, it also becomes possible to display, side by side, images of meters together with images of scenes outside an automobile photographed by a CCD (Charge Coupled Device) photographing device or the like, images for navigation, etc., and thus, the images of meters and the images other than those of the dashboard can be combined to be displayed.

For example, FIG. 1 of International Publication No. 2007/114,116 discloses an information display system that detects state information indicating the state of each part (mechanical operation state, physical state of each part, etc.) of a mobile object such as an automobile, and displays an image required for driving the mobile object on a display device, based on the detected state information. In this system, a DPF controller generates image information (MEN, SEN) based on the state information. The generated image information is given to a drawing controller. Then, the drawing controller reads a command list corresponding to the image information from a command table to execute commands, and consequently, an image corresponding to the state of the mobile object is displayed. The drawing controller is, for example, an image processing LSI. The load on the DPF controller can be alleviated by executing screen drawing with the image processing LSI, and hence, there is an advantage that the DPF controller can be realized with an inexpensive microcomputer for incorporation.

Among image information to be used in the conventional information display system, the MEN (Main Event Number) refers to a number for reading a command list for rewriting an entire screen. On the other hand, the SEN (Sub Event Number) refers to a number for reading a command list for rewriting a part of a screen. The MEN and SEN are called an SDN (Scene Design Number) collectively. In the conventional information display system, a layout screen and an element image suitable for the state of a mobile object or the event that has occurred can be displayed by generating two kinds (MEN and SEN) as image information.

Figure 10A:
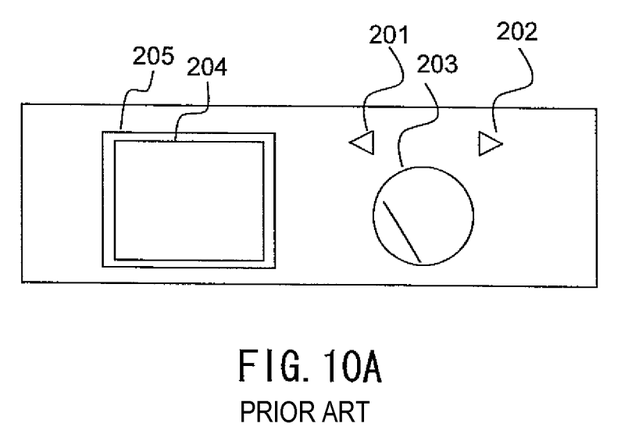
FIGS. 10A and 10B are screen examples of a conventional information display system.
Figure 10B:
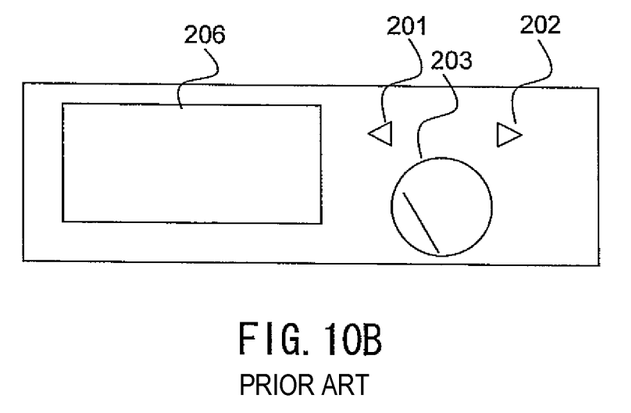

FIGS. 10A and 10B are screen examples of an information display system defined by an MEN and an SEN. FIG. 10A shows a display example of an ordinary traveling screen, and FIG. 10B shows a display example of a back traveling screen. On the ordinary traveling screen of FIG. 10A and the back traveling screen of FIG. 10B, individual MENs are defined respectively.

For example, the ordinary traveling screen of FIG. 10A includes element images such as a left winker lamp 201, a right winker lamp 202, a speedometer 203, a navigation screen 204, and a navigation screen frame 205. Further, the back traveling screen of FIG. 10B includes element images such as the left winker lamp 201, the right winker lamp 202, the speedometer 203, and a back CCD camera screen 206. Each of the element images is assigned a specific SEN for each display mode. For example, the left winker lamp 201 has two kinds of display modes: an ON state and an OFF state, and the element image indicating an ON State and the element image indicating an OFF state are assigned SENs having values different from each other.

The MENs and SENs to be used for a display are determined by matching the state information collected from each part of a mobile object with a predetermined rule in the DPF controller.

DISCLOSURE OF INVENTION

Problem to be Solved by the Invention

In the conventional information display system as described above, an SDN (MEN, SEN) is redetermined every time an "event", in which the state of a mobile object changes, occurs. For example, in the conventional information display system, every time the traveling speed of a mobile object (for example, an automobile) changes, the DPF controller receives the state information thereof and determines an SEN. The determined SDN (MEN, SEN) is sent to an image processing LSI, and the image processing LSI performs a refresh display of an element image in accordance with the newly determined SDN. The reason for this is to present the latest information in accordance with the state of the mobile object to a driver of the mobile object in real time.

However, in the conventional information display system, irrespective of whether the value of an SDN (particularly, an SEN) has changed from the previous state or not, a refresh display of an element image is performed. Therefore, even in the case where there is no change in a value of an SDN, the image processing LSI performs display processing in accordance with an SDN sent from the DPF controller every time. Thus, even in the case where there is no change in a display mode, the drawing processing of an element image is repeated, which becomes a burden on the image processing LSI.

Further, when an SDN is issued frequently from the DPF controller to the image processing LSI, and the image processing LSI is performing the drawing processing based on the previous SDN, the image processing LSI may not be able to perform the drawing processing in accordance with the new SDN immediately. In such a case, the new SDN is saved in a memory queue of the DPF controller, and the drawing processing in accordance with the new SDN can wait until the previous drawing processing in the image processing LSI is completed. However, if a number of events occur continuously, the cue is overflowed with SDNs and required SDNs may be discarded. Alternatively, there is a possibility that a time lag may be caused from the occurrence of an event to the drawing thereof. In such a case, there also arises a problem that a screen is turned into a display mode that is not intended by a designer.

In view of the above-mentioned problems, an object of the present invention is to provide an image information generation device capable of reducing the burden on an image processing LSI by avoiding the refresh of an element image whose display mode has not changed, a display control device provided with the image information generation device, an information display system for a mobile object, a module for a driver seat, and a mobile object.

Means for Solving Problem

In order to achieve the above-mentioned object, an image information generation device according to the present invention receives state information collected from each part of a mobile object, generates image information for displaying an image in accordance with a situation of the mobile object on a dot matrix type display device, and outputs the image information to an image drawing processing device synthesizing an image to be displayed on the displayed device. The image information contains a layout identifier for specifying a layout of the image to be displayed on the display device and an element image identifier for specifying a display mode of an element image in the layout. The image information generation device includes: an identifier storage portion that stores an identifier table defining a correspondence relationship between the state information and the layout identifier, a correspondence relationship between the state information and the element image identifier, and a correspondence relationship between the layout identifier and the element image identifier; an identifier determination portion that acquires state information collected from each part of the mobile object, and matches the acquired state information with the identifier table, thereby determining a layout identifier and an element image identifier in accordance with a situation of the mobile object at a time when the state information is collected; and a display management information storage portion that temporarily stores the element image identifier determined by the identifier determination portion in a partial area containing the element image in the layout. When the element image identifier is newly determined by the identifier determination portion and the newly determined element image identifier is the same as the previously determined element image identifier, the newly determined element image identifier is not output to the image drawing processing device.

According to the above-mentioned configuration, when an element image identifier is newly determined by the identifier determination portion, and the newly determined element image identifier is the same as the previously determined element image identifier, the newly determined element image identifier is not output to the image drawing processing device to void refresh of an element image whose display mode has not changed, and thus, the burden on an image processing LSI can be alleviated.

Further, a display control device, an information display system for a mobile object, a module for a driver seat, and a mobile object according to the present invention include the image information generation device according to the present invention.

Effects of the Invention

According to the present invention, an image information generation device capable of reducing the burden on an image processing LSI by avoiding the refresh of an element image whose display mode has not changed, a display control device provided with the image information generation device, an information display system for a mobile object, a module for a driver seat, and a mobile object.

DESCRIPTION OF THE INVENTION

As described above, the image information generation device according to one embodiment of the present invention has a configuration characterized as follows: in particular when an element image identifier is newly determined by the identifier determination portion, and the newly determined element image identifier is the same as the previously determined element image identifier, the newly determined element image identifier is not output to the image drawing processing device.

Further, in the image information generation device according to the above-mentioned configuration, it is preferred that the display management information storage portion includes an area for storing a completion flag indicating that the element image identifier determined by the identifier determination portion has been output to the image drawing processing device, and when an element image identifier is newly determined by the identifier determination portion, and it is determined that the previously determined element image identifier has not been output to the image drawing processing device based on the completion flag, the newly determined element image identifier is discarded. According to this configuration, when an event whose display is to be updated occurs frequently, a display can be performed without a time lag, although a display at some midpoint is omitted.

Alternatively, in the image information generation device according to the above-mentioned configuration, it is preferred that the display management information storage portion includes a queue area capable of storing a plurality of element image identifiers determined by the identifier determination portion, and an area for storing a completion flag indicating that the element image identifiers in the queue area have been output to the image drawing processing device, and when an element image identifier is newly determined by the identifier determination portion, and it is determined that a previously determined element image identifier has not been output to the image drawing processing device based on the completion flag, the newly determined element image identifier is stored in the queue area. According to this configuration, when an event whose display is to be updated occurs frequently, information regarding a change in the state of a mobile object can be displayed without being omitted, although there is a time lag.

The partial area is rectangular although not particularly limited thereto.

Hereinafter, one embodiment of the present invention will be described more specifically in the case where the present invention is applied to an automobile (vehicle) with reference to the drawings. It should be noted that a target to which the present invention is applied is not limited to only an automobile. The present invention can be applied to various vehicles (moving means or transfer means) such as a motorcycle, a motor tricycle, a special vehicle, a railcar, other road vehicles, an amphibious vehicle, an airplane, or a vessel, in addition to an automobile. Furthermore, the present invention is not limited to the vehicles mainly for movement or transfer as described above, and can also be applied to simulators allowing an operator to simulate the operation of various kinds of vehicles as described above. In the present application, the vehicles, simulators, and the like as described above will be referred to as a "mobile object" collectively.

Figure 2:
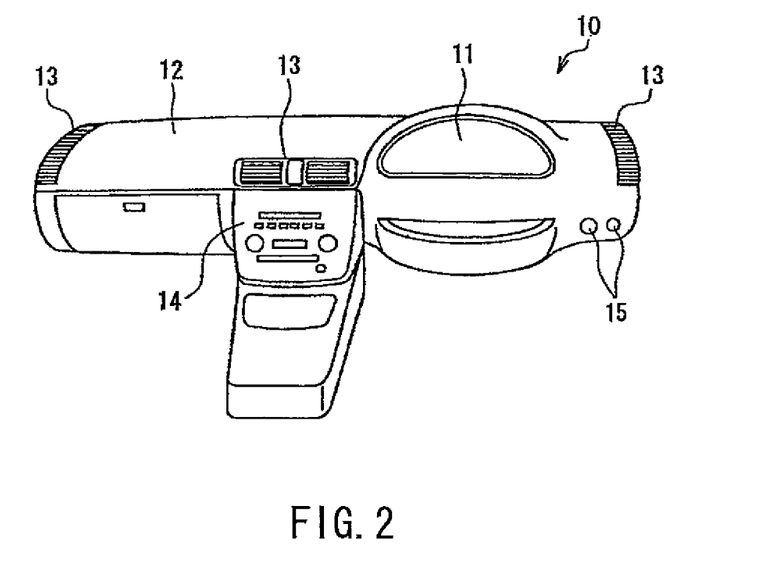
FIG. 2 is a plan view showing an outer appearance of a cockpit module (module for a driver seat) for an automobile in which the information display system for a vehicle or the like according to one embodiment of the present invention is incorporated.

FIG. 2 is a front view showing an outer appearance of a cockpit module for an automobile (module for a driver seat) with an information display system for a vehicle and the like according to the present embodiment incorporated therein. As shown in FIG. 2, a cockpit module for a vehicle 10 according to the present embodiment includes a liquid crystal display device 11 displaying a synthetic image of a dashboard for an automobile, in place of conventional analog measuring instruments such as a speedometer and a tachometer and a conventional dashboard for an automobile including an indicator lamp composed of an LED or the like.

The liquid crystal display device 11 is not a segment type liquid crystal display unit that has been used frequently in conventional automobiles, but a dot matrix type liquid crystal panel display device. The liquid crystal display device 11 is capable of displaying an image of any pattern, so that the liquid crystal display device 11 functions as an information display device for an automobile by displaying a synthetic image obtained by combining images of various elements such as various measuring instruments and an indicator lamp. Further, the liquid crystal display device 11 is also configured so as to display not only an image of the dashboard but also an image picked up by a camera mounted at a back or a side of an automobile, a car navigation image, a received image of television broadcast, a reproduced image of a DVD player or the like mounted in the automobile, etc.

The liquid crystal display device 11 is attached to an instrument panel 12 that is a frame of the cockpit module 10 so as to be positioned behind a steering wheel (not shown). The cockpit module 10 includes not only the liquid crystal display device 11 but also an air-conditioning unit (not shown), an air-conditioning duct 13 that introduces air from the air-conditioning unit into the automobile, an audio module 14, lamp switches 15, a steering mechanism (not shown), an air bag module (not shown), and the like.

The configuration of the cockpit module shown in FIG. 2 is merely an example, and the embodiment of the present invention is not limited thereto. For example, in the example shown in FIG. 2, the liquid crystal display device 11 is placed so as to face a driver. However, the present invention is not limited thereto, and the liquid crystal display device 11 may be placed instead in a center portion of the instrument panel, that is, between a driver seat and a passenger seat.

Figure 1:
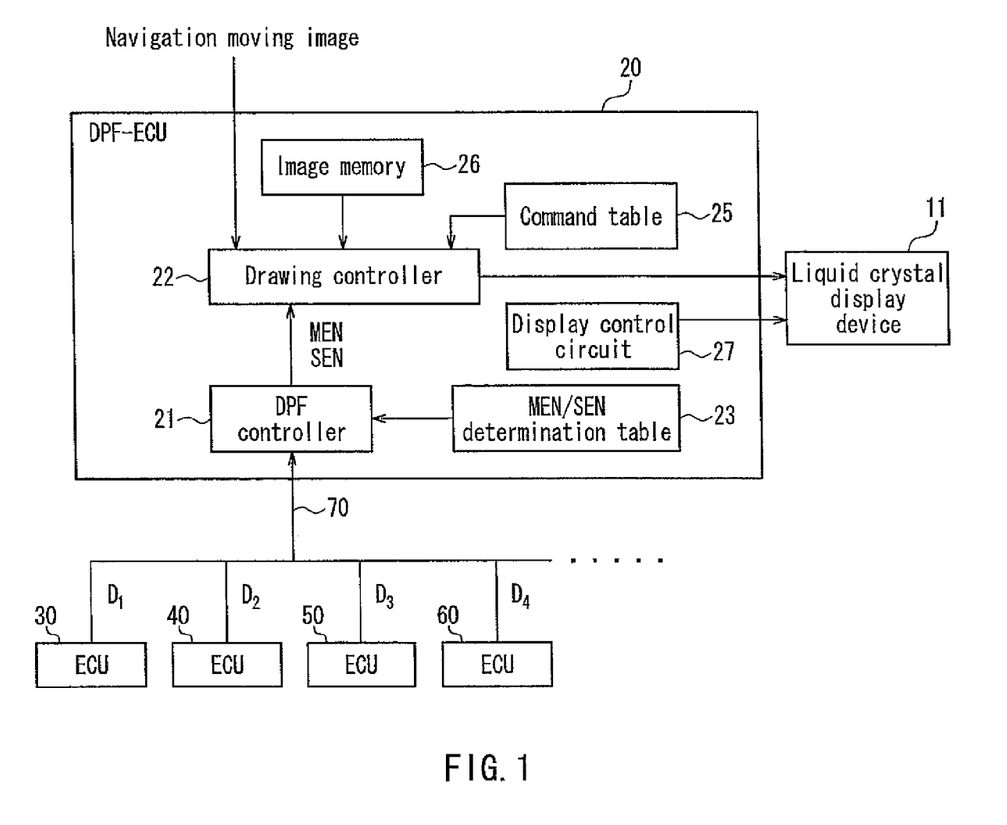
FIG. 1 is a block diagram showing a functional configuration of an information display system for a vehicle or the like according to the present embodiment.

FIG. 1 is a block diagram showing an example of a functional configuration of the information display system for an automobile according to the present embodiment. The display in the liquid crystal display device 11 is controlled by a DPF (Display Platform)-ECU 20 shown in FIG. 1. The DPF-ECU 20 is one of a number of ECUs mounted on an automobile. The DPF-ECU 20 includes a DPF controller 21 (identifier determination portion), a drawing controller 22 (image drawing processing device), an MEN/SEN determination table 23 (identifier storage portion), a command table 25, an image memory 26 (image storage portion), and a display control circuit 27. Herein, the DPF controller 21 and the MEN/SEN determination table 23 are one embodiment of the image information generation device according to the present invention, and the DPF-ECU 20 is one embodiment of the display control device of the present invention.

FIG. 1 shows an internal configuration of the DPF-ECU 20 as functional blocks. However, various modes can be considered as the mounting mode of each block on hardware. For example, all the functional blocks shown in FIG. 1 may be mounted on one circuit board, or the functional blocks shown in FIG. 1 also may be mounted, for example, separately in a plurality of semiconductor integrated circuits. In the latter case, for example, the DPF controller 21 and the MEN/SEN determination table 23 may be composed of a semiconductor integrated circuit independent from the other functional blocks. If the drawing controller 22 is composed of an image processing LSI, there is an advantage that the DPF controller 21 can be configured using a relatively inexpensive microcontroller.

The DPF-ECU 20 is connected to various ECUs 30, 40, 50, 60, . . . provided in each part of the automobile via an in-car LAN 70. The DPF-ECU 20 acquires information (state information) $D_1$ to $D_4$ . . . (hereinafter, referred to as state information D collectively, unless otherwise specified) indicating the state of each part of the automobile at a predetermined period. The "predetermined period" is set to be an arbitrary length of time in accordance with the specifications and the like of the in-car LAN 70. The transmission periods of the state information $D_1$ to $D_4$ . . . from each ECU may be different from each other. In this case, the sampling periods of the state information $D_1$ to $D_4$ . . . in the DPF-ECU 20 may be adjusted to the transmission periods of the respective state information. The DPF-ECU 20 generates a synthetic image of a dashboard for an automobile, etc. for presenting the state of an automobile or the like to a driver in an easy-to-understand manner, based on the acquired state information. The generated image is sent from the DPF-ECU 20 to the liquid crystal display device 11 to be displayed.

The "state information" refers to information indicating the state of each part of an automobile, as described above, and can contain not only information (for example, a traveling speed, an engine rotation number, etc.) on a mechanical operation state of each part of an automobile, but also various pieces of information such as information (for example, a fuel remaining amount, a room temperature, etc.) on the state not directly related to the mechanical operation of each part. Examples of the state information include the rotation number of an engine, a traveling speed, a select position, a shift position, the operation state of a direction indicator, the lighting state of lights, the open/close state of doors and trunks, the state of door locking, the state of a tire, the presence/absence of abnormality of an airbag, the worn state of seat belts, the temperature of a blowoff from an air conditioner, a room temperature, an outside temperature, the state of in-car AV equipment, the setting state of an automatic driving function, the operation state of a wiper, the remaining amount of fuel, the remaining amount of a battery, the dependence on an engine and a battery (in the case of a hybrid car), the remaining amount of oil, a radiator temperature, and an engine temperature, which are examples in the case of an automobile and do not limit the present invention.

The DPF controller 21 is a microcomputer that controls the entire operation of the DPF-ECU 20. Further, the DPF controller 21 also functions as an identifier determination portion that matches the state information D with the MEN/SEN determination table 23 to generate display identifiers (MEN, SEN) indicating which image should be generated in accordance with the state of an automobile at that time and sends the display identifiers to the drawing controller 22. The display identifiers (MEN, SEN) generated by the DPF controller 21 will be described later in detail.

The drawing controller 22 refers to the image memory 26 and the command table 25 based on the display identifiers given from the DPF controller 21, and generates an image to be displayed in the liquid crystal display device 11. Further, the DPF-ECU 20 also can input a moving image such as a navigation image from a storage device (not shown) such as a hard disk provided in the automobile. Thus, the drawing controller 22 also can incorporate a moving image into a synthetic image, if required.

The display control circuit 27 includes various circuits controlling the display of the liquid crystal display device 11, and includes, for example, various display driver circuits such as a power supply circuit, a gray-scale voltage generation circuit, and a liquid crystal display device 11, and a backlight control circuit. The display driver circuit and the like may be formed on a liquid crystal panel of the liquid crystal display device 11.

The MEN/SEN determination table 23 is a table used for determining an MEN (Main Even Number) and an SEN (Sub Event Number) that are display identifiers, based on the state information D acquired from the ECUs 30, 40, 50, 60 . . . via the in-car LAN 70.

Hereinafter, the MEN and SEN that are display identifiers will be described. The MEN is an identifier for specifying a layout of an image to be displayed on the liquid crystal display device 11. On the other hand, the SEN is an identifier for specifying a display mode of each element image in the layout specified by the MEN. The values of the MEN and SEN are defined in the MEN/SEN determination table 23 in accordance with various values to be taken by the state information D. Every time the DFP controller 21 acquires the state information D from the in-car LAN 70, the DFP controller 21 compares the acquired state information D with the MEN/SEN determination table 23 to determine the values of the MEN and SEN in accordance with the state information D, and output the values to the drawing controller 22.

Each layout specified by the MEN defines which image should be displayed in which portion of a display screen of the liquid crystal display device 11. In the information display system for an automobile of the present embodiment, the values of MENs different from each other are defined with respect to various situations determined from the content of the state information D, and thus, appropriate information can be displayed in accordance with the situation of an automobile at that time.

For example, in the case where an automobile is traveling, the displays of the speedometer and the tachometer are required. However, in the case where the engine is stopped, the displays of these meters are not required, and a navigation image and the like are rather required. Thus, it is preferred that a layout screen displaying meters such as a speedometer and a tachometer is used in the former case, and a layout screen keeping a large area for displaying a navigation image and the like is used instead of the meters in the latter case. Further, for example, in the case of an automobile model in which cameras capable of photographing the state of the outside of an automobile are provided at the back or side of an automobile, it is preferred to use a layout screen including a display area of images photographed by these cameras at a time of backward traveling or parallel parking. Thus, the information display system for an automobile of the present embodiment determines the state of an automobile at that time from the state information D, and displays the information on the liquid crystal display device 11, using a layout screen suitable for the state of an automobile, and provides required information to a driver in an easy-to-understand way.

The MEN and SEN determined by the DPF controller 21 are sent from the DPF controller 21 to the drawing controller 22. The drawing controller 22 refers to the command table 25, using the MEN and SEN respectively as indexes. In the command table 25, a plurality of kinds of command groups are previously registered. The respective command groups are associated uniquely with the respective values to be taken by the MEN and SEN. More specifically, command groups for generating a layout image are associated with the values to be taken by the MEN, respectively. Further, command groups for generating an element image are associated with the values to be taken by the SEN.

The drawing controller 22 reads command groups associated with the MEN and SEN respectively from the command table 25 and execute them. When the drawing controller 22 executes the command group associated with an MEN, an image of a layout specified by the MEN is generated. Further, when the drawing controller 22 executes the command groups associated with SENs, element images in a number corresponding to the number of the SENs given to the drawing controller 22 are generated in accordance with the values of the respective SENs. A layout image and an element image are generated respectively on a plurality of planes different from each other since they configure an overlay image. By superimposing the plurality of planes on each other, a synthetic image of a combination of the layout image and the element image is generated and displayed on the liquid crystal display device 11. A method for generating a synthetic image of a combination of a layout image and an element image is not limited thereto. For example, even by generating either one of the layout image and the element image on one plane, and repeating α-blending processing of other images repeatedly on the plane, a plurality of still images can be superimposed on each other.

The command groups in the command table 25 are previously created and registered so as to realize a display suitable for the state of each part of an automobile. Examples of the commands include a command for reading each data (bitmap data) of a layout image and an element image from the image memory 26, a command for designating the display position and size of the element image, a command for enlarging or reducing the element image, a command for designating the rotation angle of the element image, and a command for transferring an image to each plane of an overlay image.

Figure 3:
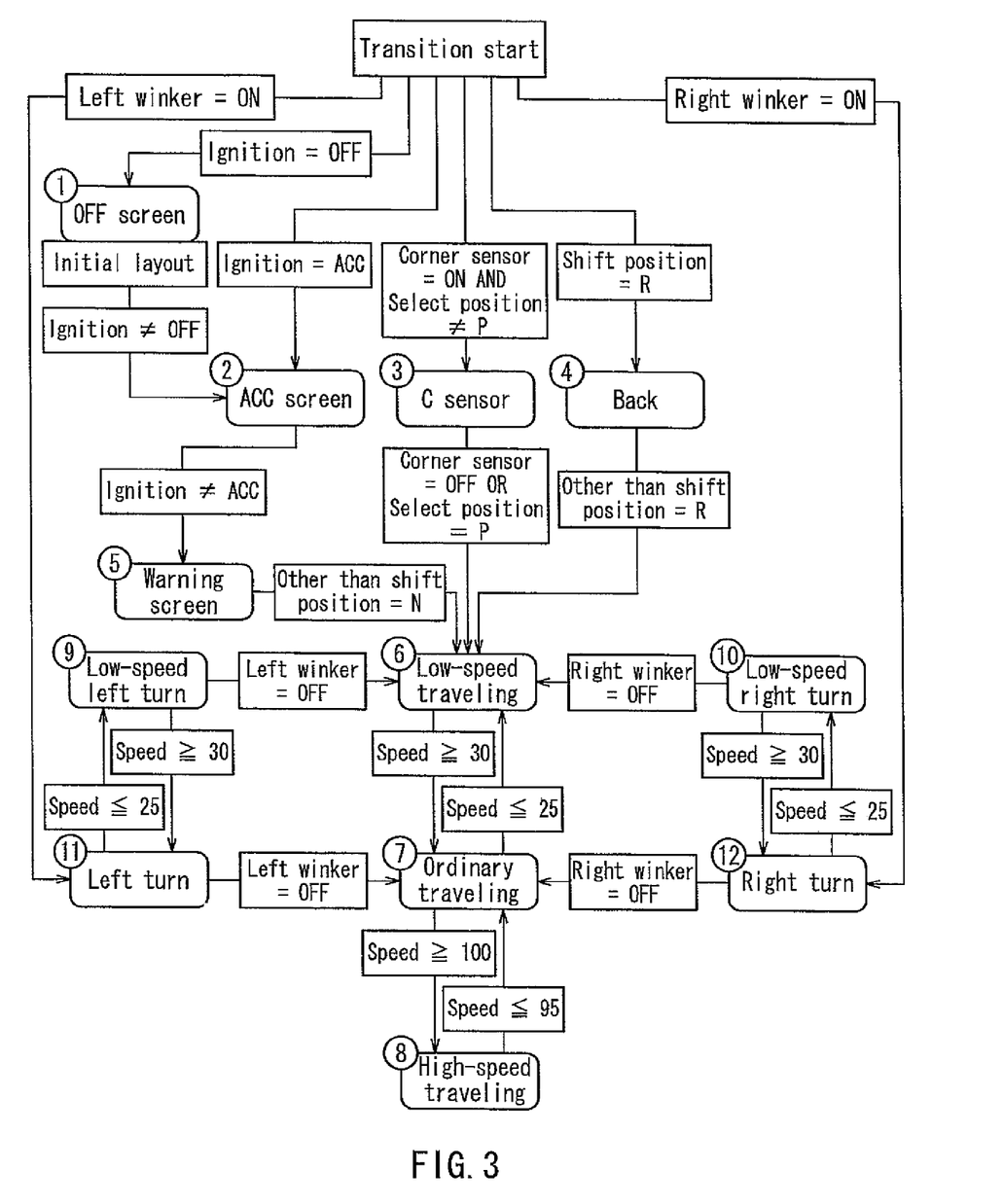
FIG. 3 is a state transition diagram showing a transition among a plurality of layouts used for a display of a liquid crystal display device 11 in an information display system for an automobile of the present embodiment.

Hereinafter, the transition condition of an MEN and a layout screen will be described with reference to FIGS. 3 and 4. FIG. 3 is a state transition diagram showing a transition among a plurality of layout screens used for a display of the liquid crystal display device 11 in the information display system for an automobile of the present embodiment.

The state transition diagram as shown in FIG. 3 is created for determining how the display of the liquid crystal display device 11 transitions in accordance with the state information D at a time of designing the information display system for an automobile. In the state transition diagram of FIG. 3, 12 kinds of layout screens represented by MEN=1-12 are present.

Arrows shown in the state transition diagram of FIG. 3 represent transition relationships among layout screens, and conditions described on the arrows are transition conditions to be satisfied for causing the transitions to occur. The transition conditions are represented as comparison expressions of values of various parameters of the state information D and a predetermined value. For example, in order to cause the transition from the layout screen of "OFF screen" at MEN=1 to "ACC screen" at MEN=2, it is necessary that the transition condition that the value of a parameter "Ignition" that is one state information D is not equal to an "OFF".

In the case where the DPF controller 21 determines a layout screen of a transition destination every time the DPF controller 21 acquires the state information D from the in-car LAN 70, the determination of the transition condition is started from the state of "Transition start" shown in FIG. 3 without fail, irrespective of which screen the immediately preceding layout screen is. Although there is no layout screen corresponding to the state of "Transition start", the state of "Transition start" is assigned MEN=0 for convenience' sake.

Figure 4:
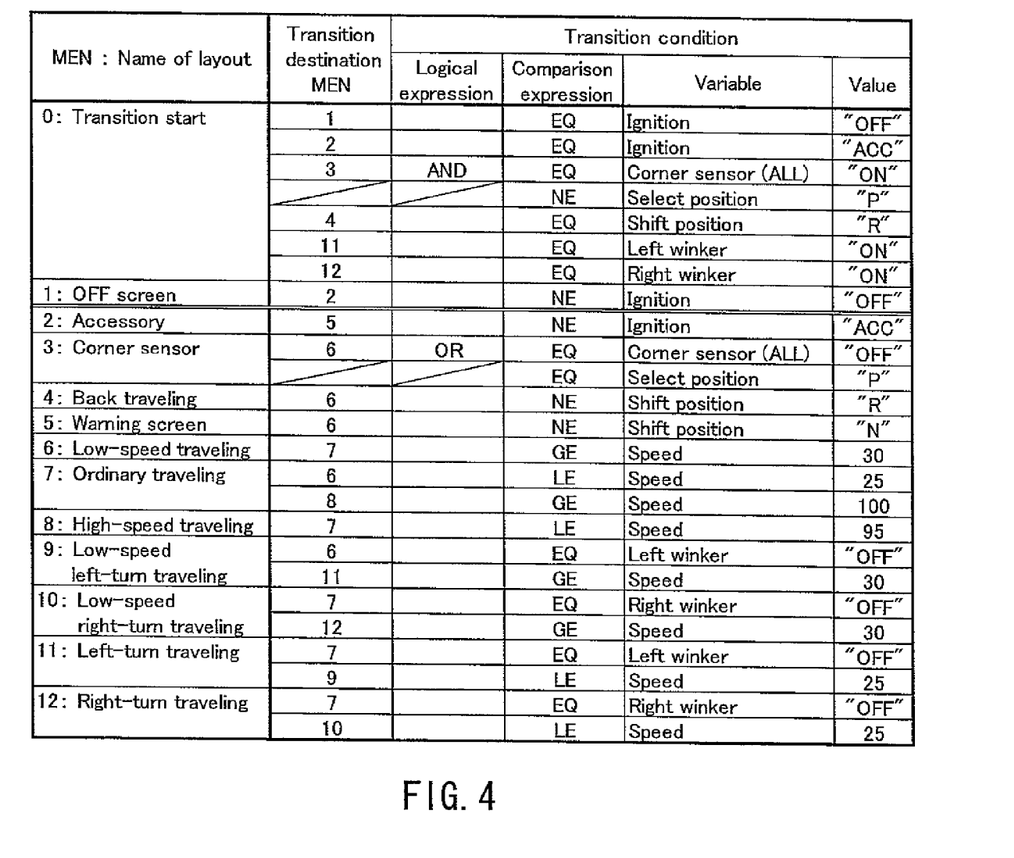
FIG. 4 is an explanatory view illustrating definition examples of an MEN transition table for realizing the state transition shown in FIG. 3.

FIG. 4 is an explanatory view illustrating definition examples of transition conditions for realizing the state transition shown in FIG. 3. The transition condition table shown in FIG. 4 is stored in the MEN/SEN determination table 23. For ease of description, FIG. 4 shows only the descriptions of information regarding the state transition conceptually, and does not show an actual data format in the MEN/SEN determination table 23.

As shown in FIG. 4, the transition condition table defines, with respect to each layout screen, MENs of layout screens that are transition destinations from the layout screen and the transition conditions for causing the transition.

As shown in FIG. 4, for example, in the case where the transition condition that the value of the state information D indicating the state of "Ignition" is "OFF" holds in the state of "Transition start" assigned MEN=0, it is defined that the transition to a layout screen specified by MEN=1 occurs. The layout screen specified by MEN=1 is a layout screen of "OFF screen" in the example of FIG. 3.

Further, the transition condition that the transition from a layout screen to another layout screen occurs also can be represented as AND or OR of at least two conditions. For example, in the example of FIG. 3, the transition condition from the state of "Transition start" at MEN=0 to the layout screen of "C sensor (Corner sensor)" at MEN=3 refers to that both the following conditions are satisfied: the value of the state information D indicating the state of "Corner sensor" is "ON" and the value of the state information D indicating the state of "Select position" is not "P" (see the column of MEN=0 in FIG. 4). Further, in the example of FIG. 3, the transition condition from the layout screen of "Corner sensor" at MEN=3 to the layout screen of "Low-speed traveling" at MEN=6 refers to that either of the following conditions is satisfied: the value of the state information D indicating the state of "Corner sensor" is "OFF" and the value of the state information D indicating the state of "Select position" is "P" (see the column of MEN=3 in FIG. 4).

As described above, when receiving the state information D, the DPF controller 21 can determine the value of an MEN in accordance with the value of the received state information D with reference to the transition conditions stored in the MEN/SEN determination table 23.

Further, the MEN/SEN determination table 23 also stores the definitions of element images contained in the respective layout screens.

Figure 5A:
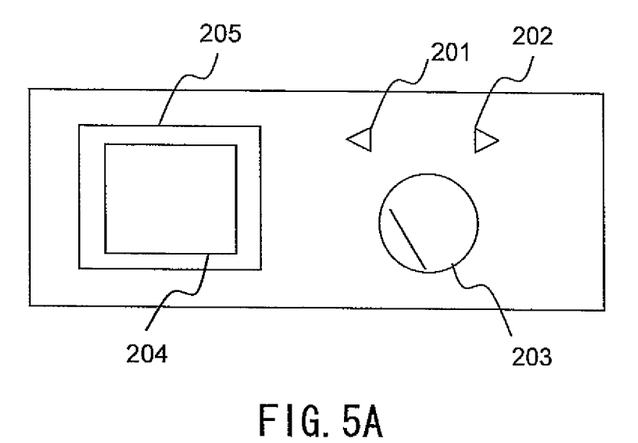
FIG. 5A is an explanatory view of one example (ordinary traveling screen) of a layout screen.
Figure 5B:
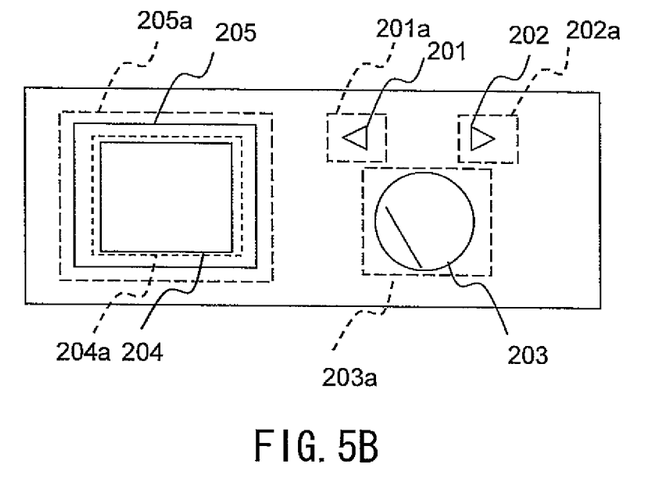
FIG. 5B is an explanatory view showing a partial area defined on the layout screen of FIG. 5A.

Herein, FIG. 5A shows a specific example of an image to be displayed on the liquid crystal display device 11. The example of FIG. 5A is a layout screen of an ordinary traveling screen (MEN=7), and contains a left winker lamp 201, a right winker lamp 202, a speedometer 203, a navigation screen 204, and a navigation careen frame 205. In the ordinary traveling screen, as shown in FIG. 5B, rectangular partial areas 201a to 205a containing the respective element images are defined. In FIG. 5B, although contour lines of the partial areas 201a to 205a are indicated by broken lines for convenience of description, the broken lines are not displayed on an actual display screen. The partial area 201a is a rectangle containing an element image of the left winker lamp 201. Similarly, the partial areas 202a, 203a, 204a, and 205a respectively are areas containing the respective element images of the right winker lamp 202, the speedometer 203, the navigation screen 204, and the navigation screen frame 205. The partial areas 201a to 205a respectively are assigned area identifiers specifying the respective areas. Herein, it is assumed that an area identifier of the partial area 201a is "1", an area identifier of the partial area 202a is "2", an area identifier of the partial area 203a is "3", an area identifier of the partial area 204a is "4", and an area identifier of the partial area 205a is "5". The area identifiers are stored in the MEN/SEN determination table 23 together with switching conditions of the element images described below.

That is, FIGS. 6A to 6D are diagrams showing examples of the definition of the element images stored in the MEN/SEN determination table 23 in the present embodiment. FIGS. 6A to 6D show the contents of data stored in the MEN/SEN determination table 23 conceptually, and needless to say, actual data formats are not equal to those shown in FIGS. 6A to 6D.

Figure 6A:
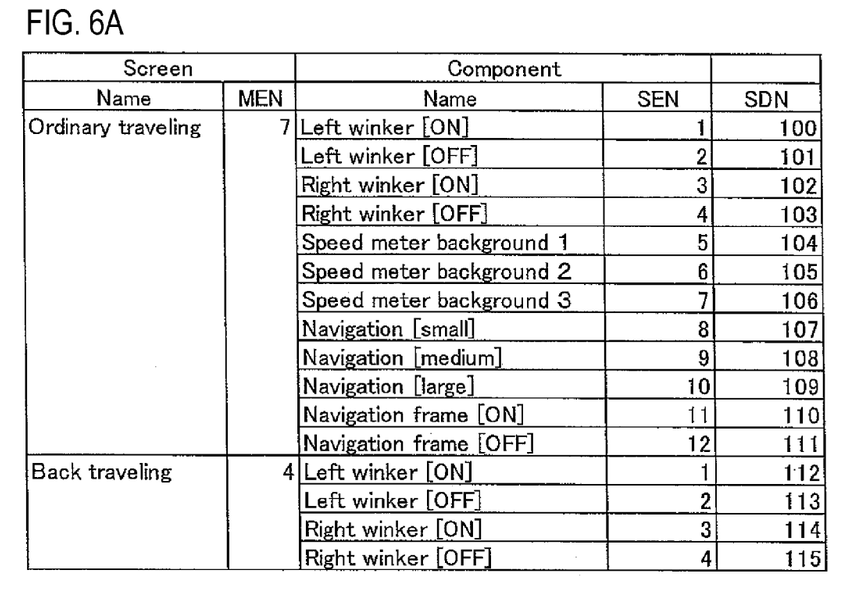
FIGS. 6A to 6D are explanatory views illustrating one example of data recorded in an MEN/SEN determination table.

As shown in FIG. 6A, the MEN/SEN determination table 23 stores, for each layout screen, an MEN allocated to a layout screen, SENs allocated to respective element images contained in the layout screen, and SDNs allocated uniquely to each combination of the MEN and the SENs. In FIG. 6A, for ease of description, although the names of the layout screens and the names of the element images are shown, the actual MEN/SEN determination table 23 does not necessarily store the names.

Figure 6B:
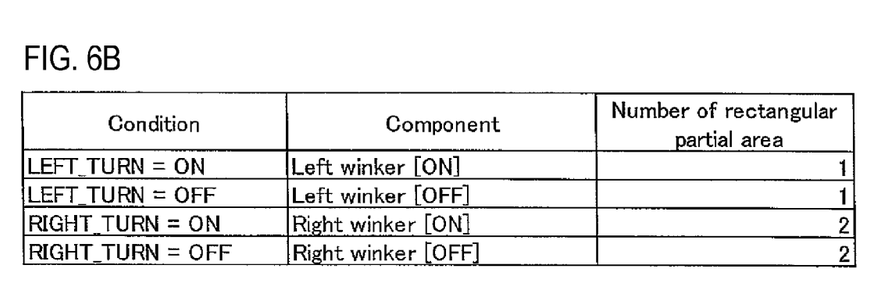

As shown in FIG. 6B, "Left winker [ON]" at MEN=1 in FIG. 6A is an element image to be selected in the case where the value of a parameter "LEFT_TURN" contained in the state information D is "ON". Further, as shown in FIG. 6B, "Left winker [OFF]" at SEN=2 is an element image to be selected in the case where the value of a parameter "LEFT_TURN" is "OFF". The area identifier "1" indicating the partial area 201a is stored so as to be associated with the element image at SEN=1, 2. Similarly, as shown in FIG. 6B, the area identifier "2" indicating the partial area 202a is stored so as to be associated with the element image (right winker) at SEN=3, 4.

Figure 6C:
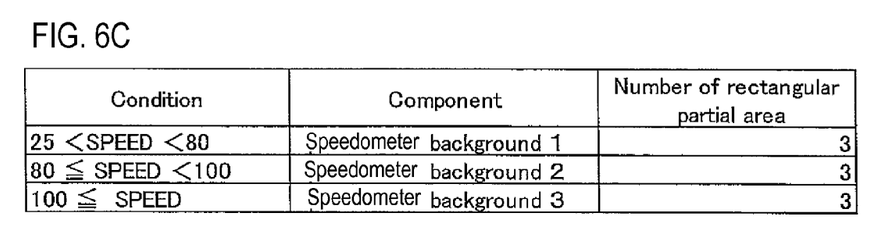
Figure 6D:
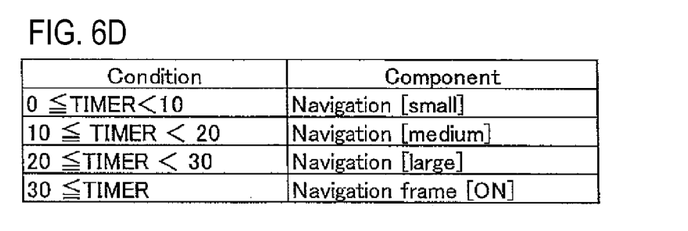

Further, as shown in FIG. 6C, "Speedometer background 1" at SEN=5 in FIG. 6A is an element image to be selected in the case where the value of a parameter "SPEED" contained in the state information D is larger than 25 km per hour and smaller than 80 km per hour. Similarly, "Speedometer background 2" and "Speedometer background 3" at SEN=6, 7 in FIG. 6A also are element images to be selected in accordance with the value of a parameter "SPEED". The "Speedometer backgrounds 1 to 3" respectively display, for example, the background (dashboard) of the speedometer 203 in different colors. The area identifier "3" indicating the partial area 203a is stored so as to be associated with the element images at SEN=5 to 7.

Figure 7A:
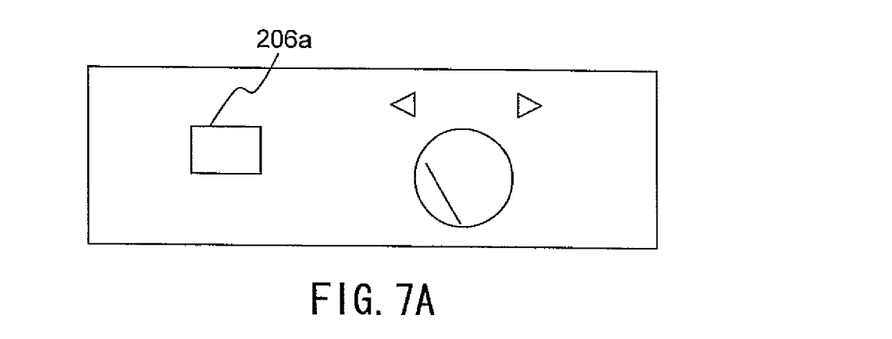
FIGS. 7A to 7D are explanatory views illustrating a state in which a navigation screen and a navigation frame are displayed.
Figure 7B:
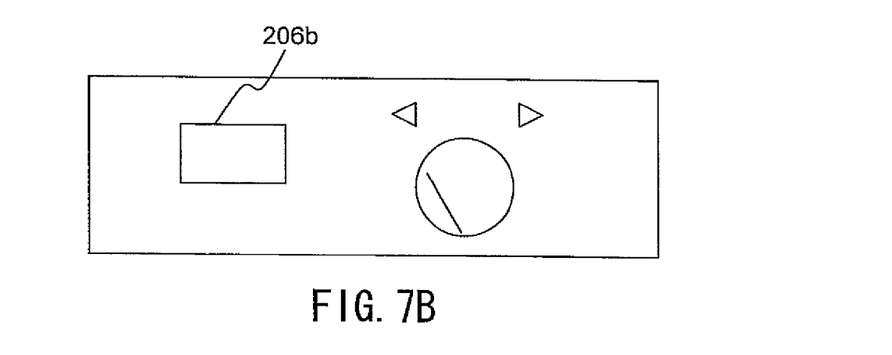
Figure 7C:
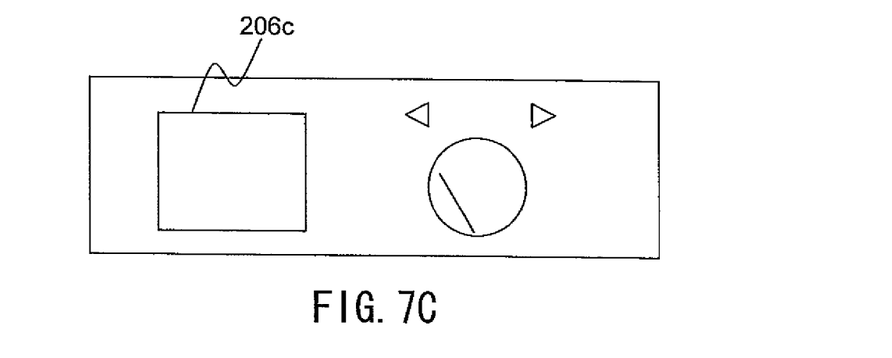
Figure 7D:
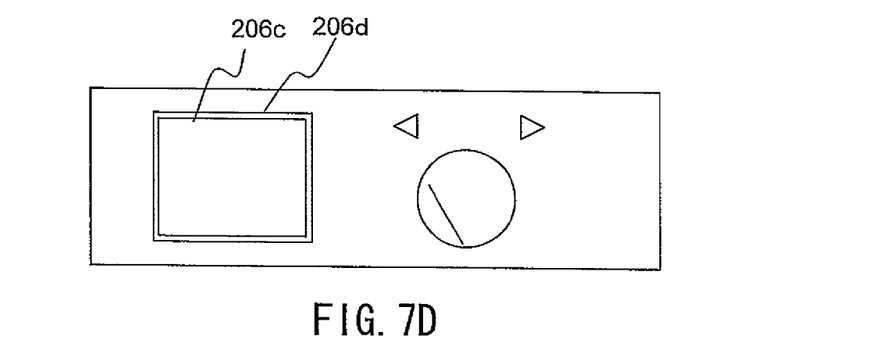

"Navigation screen" at SEN=8 to 10 in FIG. 6A and "Navigation frame" at SEN=11, 12 are element images to be selected in accordance with the value of a parameter "TIMER" contained in the state information D. The parameter "TIMER" is started from zero when a driver pushes a display button of a navigation screen. Thus, up to 10 seconds from the depression of the display button, the element image (SEN=8) of "Navigation [small]" is selected in accordance with the switching rule in FIG. 6D, and for example, as shown in FIG. 7A, a "Navigation [small]" screen 206a is displayed. Similarly, up to 20 seconds from 10 seconds later, a "Navigation [medium]" screen 206b is displayed as shown in FIG. 7B, and up to 30 seconds from 20 seconds later, a "Navigation [large]" 206c is displayed as shown in FIG. 7C. Further, when 30 seconds have elapsed, a "Navigation frame" 206d is displayed further in addition to the "Navigation [large]" screen 206c as shown in FIG. 7D.

Figure 8:
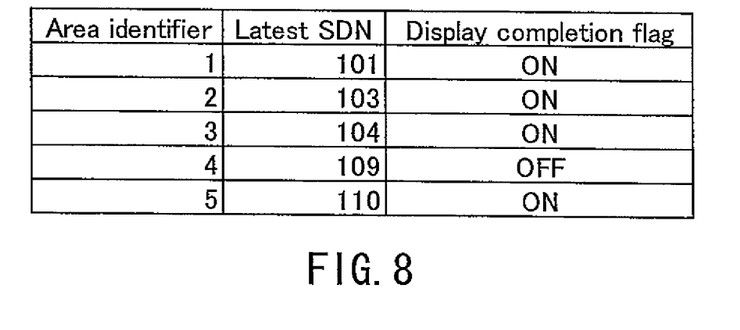
FIG. 8 is an explanatory view illustrating one exempla of data recorded in a state management table.

Further, in the present embodiment, as shown in FIG. 8, a display management table (display management information storage portion) is provided in the MEN/SEN determination table 23. The display management table stores the latest SDNs determined with respect to respective partial areas and display completion flags indicating whether or not the displays of images specified by the SDNs are completed or not so as to be associated with the respective area identifiers indicating the partial areas 201a to 205a. For example, in the example of FIG. 8, regarding the partial area 201a indicated by the area identifier "1", the latest SDN determined based on the state information D is 101 (MEN=7, SEN=2), which indicates that the display based on the SDN is completed.

In the present embodiment, every time the DPF controller 21 receives the state information D from an ECU 30 or the like, the DPF controller 21 determines an SDN (MEN, SEN) based the received state information D, and determines whether or not to output the determined SDN to the drawing controller 22 with reference to the display management table. If the currently determined SDN is the same as the SDN output previously, the DPF controller 21 does not output the SDN to the drawing controller 22. This can prevent a wasteful refresh display from being performed when there is no change in a layout screen and an element image and can alleviate the burden on the drawing controller 22.

Figure 9:
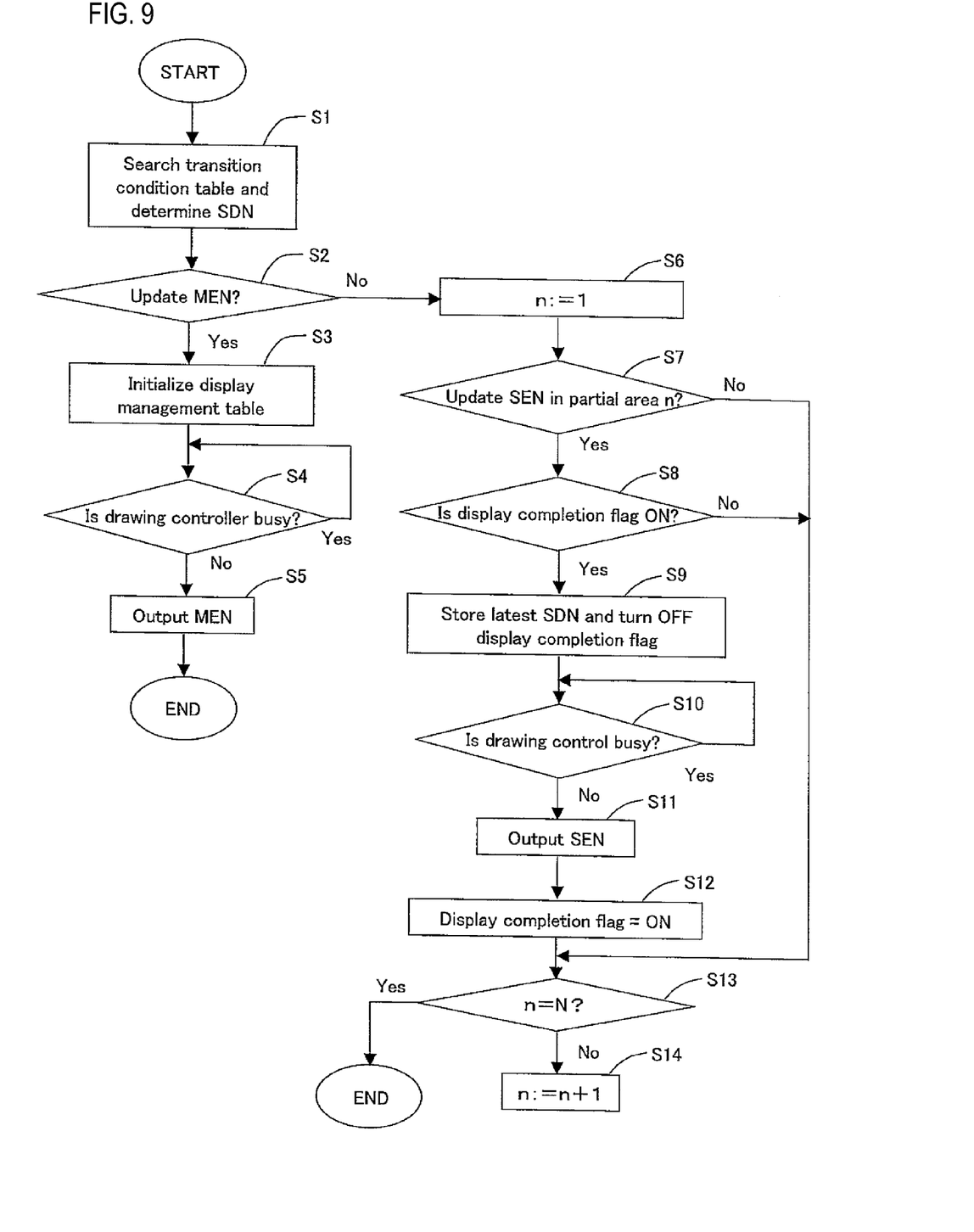
FIG. 9 is a flowchart illustrating a procedure of SDN issuance processing performed by a DPF controller.

Herein, FIG. 9 shows a procedure of SDN issuance processing performed by the DPF controller 21. The processing is started when the DPF controller 21 receives the state information D from the ECU 30 or the like.

First, the DPF controller 21 searches the transition condition table shown in FIG. 4, and determines an SDN (MEN, SEN) in accordance with the received state information D (Step S1). Then, the DPF controller 21 determines whether or not an MEN different from the previous one has been determined in the processing in Step S1, with reference to the display management table in the MEN/SEN determination table 23 (Step S2). Then, in the case where an MEN different from the previous one is determined, the DPF controller 21 initializes the display management table (Step S3). Then, the DPF controller 21 is placed in a standby state while the drawing controller 22 is busy (Step S4) and outputs the MEN determined in Step S1 to the drawing controller 22 when the drawing controller 22 becomes capable of processing (Step S5).

On the other hand, in Step S2, in the case where the DPF controller 21 determines that the MEN has not been updated, the DPF controller 21 substitutes an initial value 1 into a variable n (Step S6). The variable n represents an area identifier of a partial area to be processed in the following processing. Next, the DPF controller 21 determines whether or not an SEN different from the previous one has been determined in the processing in Step S1 regarding a partial area represented by an area identifier n (hereinafter, referred to as "partial area n") (Step S7). In the case where an SEN different from the previous one has been determined, the DPF controller 21 determines weather or not the display using the previous SEN has been completed in the partial area n with reference to the display completion flag of the display management table (Step S8). If the display using the previous SEN has been completed, the DPF controller 21 stores the latest SDN determined in Step S1 as an SDN in the partial area n in the display management table and turns OFF a display completion flag in the partial area n (Step S9). Then, while the drawing controller 22 is busy, the DPF controller 21 is placed in a standby state (Step S10), and when the drawing controller 22 becomes capable of processing, the DPF controller 21 outputs the latest SEN determined in Step S1 to the drawing controller 22 (Step S11). When outputting the latest SEN, the DPF controller 21 turns ON the display completion flag in the partial area n in the display management table (Step S12). In the present embodiment, the DPF controller 21 outputs the SEN determined in the DPF controller 21 to the drawing controller 22, and thus, the DPF controller 21 turns ON the display completion flag assuming that the display using the SEN has been completed. However, the DPF controller 21 may turn ON the display completion flag upon being notified of the actual completion of the display from the drawing controller 22.

On the other hand, in the case where it is determined that the same SEN as the previous one has been determined in Step S7, the process proceeds to Step S13, skipping Steps S8 to S12. Even in the case where it is determined that the display using the previous SEN has not been completed in Step S8, the process proceeds to Step S13, skipping Steps S9 to S12.

In Step S13, it is determined whether or not the processing has been completed with respect to all the partial areas (n=1 to N), and if the processing has not been completed, the value of the variable n is incremented by 1 (Step S14), and the processing after Step S7 is repeated.

Due to the above-mentioned processing, in the case where the SEN determined previously is the same as that determined currently, the currently determined SEN is not output to the drawing controller 22, and hence, the burden on the drawing controller 22 can be alleviated.

According to the processing illustrated in FIG. 9, in the case where it is determined that the display of the previous SEN has not been completed in Step S8, the newly determined SEN is discarded without being used by skipping Steps S9 to S12. Such processing has no problem in the case where there is no inconvenience even when an event which occurs in the middle of a plurality of events is not displayed when the plurality of events occur continuously along with the change in situation of an automobile. For example, in the case where a shift lever is moved from the position of Neutral (N) to the position of Parking (P), passing through the position of Back traveling (R), the state information D indicating that the shift position is moved to (R) is generated. In this case, it is not important information that the shift position is temporarily moved to (R), and hence, there is no problem if it is not displayed that the shift position is moved to (R).

However, regarding the information to be displayed despite a time lag, it is preferred that the DPF controller 21 waits until the display based on the previous SDN is completed, and displays the element image thereof. In this case, a queue area capable of storing at least two SDNs is provided in the display management table, and if the display of the previous SDN has not been completed, the subsequent SDN may be output from the queue area to the drawing controller 22 after the display using the SDN is completed.

The above-mentioned embodiment does not limit the technical range of the present invention, and can be modified variously within the scope of the present invention. For example, in the above-mentioned specific example, a screen to be displayed on the liquid crystal display device 11 is composed of a combination of a layout specified by one MEN and an element image specified by one or a plurality of SENs. For example, in the case of performing a display in which a screen of the liquid crystal display device 11 is divided into a plurality of parts, the case of displaying an image varied depending upon the viewing angle of the liquid crystal display device 11, etc., a plurality of layouts may be used. Thus, in this case, a plurality of MENs are determined. In the above-mentioned embodiment, an example in which one or a plurality of SENs are determined with respect to one MEN has been illustrated. However, one or a plurality of SENs may be complexed with respect to one SEN.

Further, in the above-mentioned embodiment, two kinds of display identifiers: MEN and SEN are used. However, the number and kind of the display identifiers are not limited to the specific example. Further, although a specific example of an identifier table used for determining a display identifier has been illustrated, this is merely one specific example, and the configuration of the identifier table is considered variously.

Further, although a liquid crystal display device is used in the above-mentioned embodiment, a target to which the present invention is applied is not limited to the information display system using the liquid crystal display device. Any display device can be used, if at least a portion displaying a synthetic image in accordance with state information is of a dot matrix type.

Further, a target to which the present invention is applied is not limited to only the information display system to be incorporated in an instrumental panel as described above. For example, a display device of a type of displaying or projecting an image on a window of a driver seat front face of a vehicle or the like, or an information display system using a display device of a type to be worn on a driver's body may be used.

Further, the information display system for a mobile object according to the present invention can display not only the state of a mobile object such as a vehicle, but also, for example, any other images (still image or moving image) such as a video obtained by photographing a scene outside a vehicle, a video stored in a storage medium provided in a vehicle or the like, and a video obtained by communication with the outside, and additional information such as character information.

INDUSTRIAL APPLICABILITY

The present invention can be used as an image information generation device capable of generating, from state information indicating the state of each part of a mobile object such as an automobile, image information for displaying an image required for driving the mobile object, a display control device provided with the image information generation device, an information display system for a mobile object, a module for a driver seat, and a mobile object.

The invention claimed is:

1. An image information generation device that receives state information collected from each part of a mobile object, generates image information for displaying an image in accordance with a situation of the mobile object on a display device, and outputs the image information to an image drawing processing device synthesizing an image to be displayed on the display device,
   the image information containing a layout identifier for specifying a layout of the image to be displayed on the display device and an element image identifier for specifying a display mode of an element image in the layout,
   the image information generation device comprising:
   an identifier storage portion that stores an identifier table defining a correspondence relationship between the state information and the layout identifier, a correspondence relationship between the state information and the element image identifier, and a correspondence relationship between the layout identifier and the element image identifier;
   an identifier determination portion that acquires state information collected from each part of the mobile object, and matches the acquired state information with the identifier table, thereby determining a layout identifier and an element image identifier in accordance with a situation of the mobile object at a time when the state information is collected; and
   a display management information storage portion that temporarily stores the element image identifier determined by the identifier determination portion in a partial area of the layout which contains the element image,
   wherein, when the element image identifier is newly determined by the identifier determination portion and the newly determined element image identifier is the same as the previously determined element image identifier, the newly determined element image identifier is not output to the image drawing processing device.

2. The image information generation device according to claim 1, wherein the display management information storage portion includes an area for storing a completion flag indicating that the element image identifier determined by the identifier determination portion has been output to the image drawing processing device, and
   when an element image identifier is newly determined by the identifier determination portion, and it is determined that the previously determined element image identifier has not been output to the image drawing processing device based on the completion flag, the newly determined element image identifier is discarded.

3. The image information generation device according to claim 1, wherein the display management information storage portion includes a queue area capable of storing a plurality of element image identifiers determined by the identifier determination portion, and an area for storing a completion flag indicating that the element image identifiers in the queue area have been output to the image drawing processing device, and
   when an element image identifier is newly determined by the identifier determination portion, and it is determined that a previously determined element image identifier has not been output to the image drawing processing device based on the completion flag, the newly determined element image identifier is stored in the queue area.

4. The image information generation device according to claim 1, wherein the partial area is rectangular.

5. A display control device, comprising:
the image information generation device according to claim 1;
an image storage portion that stores a layout image corresponding to each layout identifier and an element image corresponding to each element image identifier; and
the image drawing processing device which is arranged to acquire a layout identifier and an element image identifier output from the image information generation device, to extract a layout image corresponding to the layout identifier and an element image corresponding to the element image identifier from the image storage portion, and to synthesize the layout image and the element image to generate an image to be displayed on the display device.

6. An information display system for a mobile object, comprising the display control device according to claim 5; and
the display device is arranged to display an image generated by the image drawing processing device of the display control device.

7. An information display system for a mobile object according to claim 6, wherein the display device is a liquid crystal display device.

8. A mobile object comprising the information display system for a mobile object according to claim 6, wherein the display device is attached to a position visibly recognizable at least from a driver seat.

9. The mobile object according to claim 8, wherein the mobile object is an automobile, and
the state information is sent from an ECU provided in each part of the automobile to the image information generation device via an in-car network.

* * * * *